(12) United States Patent
Pejkic et al.

(10) Patent No.: US 11,742,954 B2
(45) Date of Patent: *Aug. 29, 2023

(54) SYSTEM AND METHOD FOR RECEIVER SENSITIVITY IMPROVEMENT

(71) Applicant: THE REGENTS OF THE UNIVERSITY OF CALIFORNIA, Oakland, CA (US)

(72) Inventors: Ana Pejkic, La Jolla, CA (US); Stojan Radic, San Diego, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/562,846

(22) Filed: Dec. 27, 2021

(65) Prior Publication Data

US 2022/0200705 A1    Jun. 23, 2022

Related U.S. Application Data

(63) Continuation of application No. 16/629,022, filed as application No. PCT/US2018/041123 on Jul. 6, 2018, now Pat. No. 11,212,011.

(60) Provisional application No. 62/530,034, filed on Jul. 7, 2017.

(51) Int. Cl.
*H04B 10/67* (2013.01)
*H04B 10/69* (2013.01)

(52) U.S. Cl.
CPC ......... *H04B 10/697* (2013.01); *H04B 10/671* (2013.01)

(58) Field of Classification Search
CPC ............... H04B 10/671; H04B 10/697; H04B 10/6971; H04B 10/6973
See application file for complete search history.

(56) References Cited

U.S. PATENT DOCUMENTS

| | | | |
|---|---|---|---|
| 5,210,631 A | 5/1993 | Huber et al. | |
| 5,963,567 A | 10/1999 | Veselka et al. | |
| 6,490,069 B1 | 12/2002 | Kahn et al. | |
| 6,590,910 B2 | 7/2003 | Lin | |
| 6,879,433 B1 | 4/2005 | Yamashita et al. | |
| 6,920,263 B2* | 7/2005 | Tadakuma | H04B 10/508 385/27 |

(Continued)

FOREIGN PATENT DOCUMENTS

WO      2015127478 A1      8/2015

OTHER PUBLICATIONS

Alic, N., "Nonlinearity Cancellation in Fiber Optic Links Based on Frequency Referenced Carriers"; Aug. 1, 2014; Journal of Lightwave Technology, vol. 32, No. 15.

(Continued)

*Primary Examiner* — Nathan M Cors
(74) *Attorney, Agent, or Firm* — Eleanor Musick; Torrey Pines Law Group PC

(57) ABSTRACT

A system and method for ultrashort signal detection adds an optical weighting element upstream of a detector within a direct detection receiver. The optical weighting element is configured to generate an optical pulse that closely matches at least one ultrashort pulse within the input signal so that portions of the input signal that are nonoverlapping with the at least one ultrashort pulse are rejected.

9 Claims, 9 Drawing Sheets

(56) References Cited

U.S. PATENT DOCUMENTS

| | | | |
|---|---|---|---|
| 6,999,177 | B2 | 2/2006 | Muro et al. |
| 7,068,943 | B2 | 6/2006 | Korolev et al. |
| 7,099,541 | B2 | 8/2006 | Terahara et al. |
| 7,164,526 | B2 | 1/2007 | McKinstrie et al. |
| 7,245,833 | B1 | 7/2007 | Volkening |
| 7,315,697 | B2 | 1/2008 | Smilanski et al. |
| 7,440,112 | B2 | 10/2008 | Kurokawa et al. |
| 7,450,618 | B2 | 11/2008 | Dantus et al. |
| 7,483,608 | B2 | 1/2009 | Inoue et al. |
| 7,650,080 | B2 | 1/2010 | Yap et al. |
| 7,796,244 | B2 | 9/2010 | Radic |
| 8,155,530 | B2 | 4/2012 | Alić et al. |
| 8,275,263 | B1 | 9/2012 | Franklin |
| 8,447,155 | B1 | 5/2013 | Kuo et al. |
| 8,451,528 | B1 | 5/2013 | Kuo |
| 8,482,847 | B2 | 7/2013 | Kuo et al. |
| 8,611,759 | B1 | 12/2013 | Kvavle et al. |
| 8,879,588 | B2 | 11/2014 | Radic |
| 9,106,325 | B2 | 8/2015 | Ataie et al. |
| 9,110,352 | B2 | 8/2015 | Kuo et al. |
| 9,258,060 | B2 | 2/2016 | Yan et al. |
| 9,287,993 | B1 | 3/2016 | Adleman et al. |
| 9,625,351 | B2 | 4/2017 | Ataie et al. |
| 10,411,810 | B2 | 9/2019 | Kuo et al. |
| 10,523,329 | B2 | 12/2019 | Esman |
| 11,212,011 | B2 | 12/2021 | Pejkic |
| 2002/0071454 | A1 | 6/2002 | Lin |
| 2002/0164135 | A1 | 11/2002 | Tadakuma et al. |
| 2003/0026527 | A1 | 2/2003 | Takahashi et al. |
| 2004/0184815 | A1 | 9/2004 | Korolev et al. |
| 2005/0129412 | A1 | 6/2005 | Centanni et al. |
| 2006/0002715 | A1 | 1/2006 | Igarashi et al. |
| 2006/0061853 | A1 | 3/2006 | Chraplyvy et al. |
| 2007/0097854 | A1* | 5/2007 | Chung .............. H04J 14/005 370/208 |
| 2007/0206950 | A1 | 9/2007 | Liu et al. |
| 2007/0280613 | A1 | 12/2007 | Inoue et al. |
| 2008/0285606 | A1 | 11/2008 | Kippenberg et al. |
| 2010/0111305 | A1* | 5/2010 | Yuan .................. G01J 1/44 250/214 R |
| 2010/0284431 | A1 | 11/2010 | Inoue |
| 2013/0051807 | A1 | 2/2013 | Huang et al. |
| 2014/0254619 | A1 | 9/2014 | Ataie et al. |
| 2014/0270783 | A1 | 9/2014 | Prather et al. |
| 2014/0341265 | A1 | 11/2014 | Alic et al. |
| 2017/0019178 | A1 | 1/2017 | Alic et al. |
| 2017/0049381 | A1 | 2/2017 | Lieber et al. |
| 2017/0115333 | A1 | 4/2017 | Radic |
| 2019/0165793 | A1* | 5/2019 | Tsunoda .............. H03L 7/085 |

OTHER PUBLICATIONS

Ataie, v., et al., "Ultrafast Absolute Ranging by Coherent Parametric Comb," in Optical Fiber Communication Conference, OSA Technical Digest (online) (Optical Society of America, 2013), paper OTh3D.2.

Bernhardt, B., et al.; "Cavity-enhanced dual-comb spectroscopy", Nature Photonics, Nov. 29, 2009; 10 pages; (published on-line) vol. 4 No. 55-57.

Bres, C-S., et al.; "Reconfigurable parametric channelized receiver for instantaneous spectral analysis"; Optic Express; Feb. 14, 2011; pp. 3531-3541; vol. 19, No. 4.

Coddington, I., et al.; "Coherent Multiheterodyne Spectroscopy Using Stabilized Optical Frequency Combs"; Physical Review Letters; Jan. 11, 2008; pp. 13902-1-13902-4; vol. 100.

Coddinton, I., et al.; "Rapid and precise absolute distance measurements at long range"; Nature Photonics, Jun. 2009; pp. 351-356; vol. 3.

Gohle, C., et al.; "Frequency Comb Vernier Spectroscopy for Broadband, High-Resolution, High-Sensitivity Absorption and Dispersion Spectra"; Physical Rev. Letters; Dec. 31, 2007; pp. 263902-1-263901-4; vol. 99.

Hu, J, et al.; "Dynamic Digital Channelizer Based on Spectrum Sensing"; PLOS One; Aug. 6, 2015; 11 pages; vol. 10, No. 8.

Huynh, C.K., et al.; "Noise performance of phase-insensitive multicasting in multi-stage parametric mixers"; Optics Express, Jan. 14, 2013; pp. 804-814; vol. 21, No. 1.

Kuo, Bill P.-P. et al.; "Continuous-wave, short-wavelength infrared mixer using dispersion-stabilized highly-nonlinear fiber"; Optics Express, Jul. 30, 2012; pp. 18422-18431; vol. 20, No. 16.

Kuo, Bill P.-P. et al.; "Highly nonlinear fiber with dispersive characteristic invariant to fabrication fluctuations"; Optics Express; Mar. 26, 2012, pp. 7716-7725.; vol. 20, No. 7.

Kuo, Bill P.-P. et al.; "Simultaneous Wavelength-Swept Generation in NIR and SWIR Bands Over Combined 329-nm Band Using Swept-Pump Fiber Optical Parametric Oscillator"; Journal of Lightwave Technology, Feb. 15, 2011; pp. 410-416; vol. 29, No. 4.

Kuo, Bill P.-P. et al.; "Transmission of 64—GB/s RZ-OOK Channel Over 100-km SSMF by Wavelength-Transparent Conjugation"; Journal of Lightwave Technology; pp. 516-523; Feb. 15, 2011; vol. 29, No. 4.

Kuo, Bill P.-P. et al.; "Wideband Parametric Frequency Comb as Coherent Optical Carrier; Journal of Lightwave Technology"; Nov. 1, 2013; pp. 3414-3419; vol. 31, No. 21.

Myslivets, E. et al., "Generation of wideband frequency combs by continuous-wave seeding of multistage mixers with synthesized dispersion"; Optics Express; Jan. 30, 2012; pp. 3331-3344; vol. 20, No. 3.

Myslivets, Evgeny, et al.; "Spatially Resolved Measurements of the Chromatic Dispersion in Fibers"; Journal of Lightwave Technology; Feb. 1, 2015; pp. 597-608; vol. 33, No. 3.

PCT/US2018/041123, International Search Report and Written Opinion, dated Sep. 28, 2018; 8 pages.

Pejkic, Ana, et al.; "All-optical switching in a highly efficient parametric fiber mixer: design study"; Optics Express; Sep. 22, 2014; vol. 22, No. 19.

Radic, S.; "Parametric signal processing"; IEEE Journal of Selected Topics in Quantum Electronics; Mar./Apr. 2012; pp. 670-680; vol. 18, No. 2.

Temprana, E., et al.; "Low-noise parametric frequency comb for continuous C-plus-L-band 16-QAM channels generation," Optics Express 22, Mar. 24, 2014, pp. 6822-6828 vol. 22, No. 6.

Tong, Z. et al.; "Spectral linewidth preservation in parametric frequency combs seeded by dual pumps"; Optics Express; Jul. 30, 2012; pp. 17610-17619; vol. 20 No. 16.

Wiberg et al.; "Coherent Filterless Wideband Microwave/Millimeter-Wave Channelizer Based on Broadband Parametric Mixers"; Journal of Lightwave Technology, Oct. 15, 2014; pp. 3609-3617; vol. 32, No. 20.

* cited by examiner

SYSTEM AND METHOD FOR RECEIVER SENSITIVITY IMPROVEMENT

RELATED APPLICATIONS

This is a continuation of application Ser. No. 16/629,022, filed Jan. 6, 2020, issued as U.S. Pat. No. 11,212,011, which is a 371 national stage filing of International Application No. PCT/US2018/041123, filed Jul. 6, 2018, which claims the benefit of the priority of U.S. Application No. 62/530,034, filed Jul. 7, 2017, each of which is incorporated herein by reference in its entirety.

FIELD OF THE INVENTION

The present invention is directed to a direct detection receiver scheme with improved sensitivity for detection of a wideband signal obscured by optical noise.

BACKGROUND OF THE INVENTION

Wide bandwidth, short pulse duration, and highly correlated frequency content of femtosecond and picosecond optical pulse sources have given rise to technological advances in a variety of disciplines, including telecommunications, medical imaging and treatment, biology, chemistry, and metrology. The key factor that contributes to wide deployment of ultrafast pulse sources—the short pulse duration—also determines the frequency span of ultrafast events. While significant progress has been made in ultrafast pulse source design and performance, the associated detector technology has failed to keep pace. As a result, the reliability of information carried by an ultrafast signal is defined, and limited, by detector performance.

In general, an ideal detector maximizes signal energy while overcoming uncertainty introduced by noise—this characteristic becomes even more important for short optical pulses. Optimal signal-noise discrimination is realized if the detector impulse response matches the incoming optical signal, an approach referred to as "matched filtering," which is the optimal linear filter for maximizing the signal-to-noise ratio (SNR) in the presence of additive stochastic noise. The optimal detection of an ultrashort, wide-band signal, dictates a wide-band (~THz) detector, well beyond the capabilities of existing detector technology which is limited to a range of less than 100 GHz, thus making optimal direct detection of femtosecond and picosecond optical pulses unattainable at this time. The signal detection task becomes significantly more challenging if an optical signal is buried in noise, a scenario particularly common in telecommunication, medicine, biology, and astronomy. Sub-optimal detection of the optical signal obscured by noise deteriorates detected signal quality, often resulting in information loss. The electrical bandwidth parameter, therefore, sets the limit on the detected signal fidelity, posing the fundamental limitation in ultrafast signal reception and decoding.

Various techniques have been attempted to decrease signal estimation uncertainty, including time averaging, spectral slicing, and time gating. When applied to ultrafast pulse detection, each approach manifests a distinct set of trade-offs. Time average represents the simplest way to reduce noise, but has the disadvantage of decreasing measurement speed, which is detrimental in most applications. Spectral slicing has been used for signal event detection, however, its implementation in sub-picosecond pulse detection raises the problem that a direct-filtering realization is prone to pulse distortions. The alternative multicasting approach requires large frequency comb spectral widths. The time gating technique is arguably the most widely used detection method in femtosecond pulse detection, but its use is limited to applications where the signal timing is known. Despite the associated complexity, time gating has been implemented in coherent receiver architecture to eliminate unwanted temporal events or noise in narrow-band pulses, or to reduce timing jitter and inter-symbol interference effects in direct detection receivers. Although widely-used, the inherent relation that exists between ultrafast time gating and narrow-band optical-to-electrical receiver performance in detection of noisy ultrafast signals has not been addressed in real-time systems to date.

The detected signal quality represents one of the central limitations in the ultrashort pulse source implementation due to inability of current, narrow-band, detector technologies to distinguish between the useful signal and integrated noise. The sensitivity of the narrow-band detector can be improved if its performance is decoupled from the electrical bandwidth.

SUMMARY

To address the limitations in the prior art, the inventive approach employs an optical gate prior to a narrow-band detector and demonstrate a receiver sensitivity enhancement, quantified by an order of magnitude decrease of the probability of error. Receiver sensitivity can be markedly improved with the aid of a signal-matched optical gate that mitigates the sub-optimal detector deficiencies.

The operating principle of an optical weighting receiver according to embodiment of the invention involves applying optical weighting—multiplying by a weighting function ($f(t)$) prior to impulse response detection. The optical weighting operation rejects optical noise beyond the signal temporal duration, thus preempting the mixing of the signal with the portion of the noise that does not overlap in time with signal.

In one aspect of the invention, an optical receiver for ultrafast signal detection includes a direct detection receiver configured for receiving an input signal, the input signal comprising at least one ultrashort pulse within signal noise; and an optical weighting element disposed upstream of the direct detection receiver, the optical weighting element configured to impose optical weighting on the input signal to exclude one or more portions of the input signal that are nonoverlapping in time with the at least one ultrashort pulse. The optical weighting may be configured to exclude a period of time within the input signal corresponding to the at least one ultrashort pulse. The modulator may be configured to implement an optical weighting function $f(t)$ according to the relationship $$f(t) = \begin{cases} s(t), & t_0 - \frac{T_s}{2} + nT < t < t_0 + \frac{T_s}{2} + nT \\ 0, & \text{otherwise} \end{cases}.$$

In some embodiments, the optical weighting element is an amplitude modulator. In other embodiments, the optical weighting element is a four wave mixer. In another aspect of the invention, an optical receiver for ultrashort signal detection includes an optical weighting element disposed upstream of a detector within a direct detection receiver, the optical weighting element configured to generate an optical pulse that closely matches at least one ultrashort pulse within the input signal so that portions of the input signal that are nonoverlapping with the at least one ultrashort pulse are rejected. The optical weighting element may execute an optical weighting function ƒ(t) according to the relationship $$f(t) = \begin{cases} s(t), & t_0 - \frac{\tau_s}{2} + nT < t < t_0 + \frac{\tau_s}{2} + nT \\ 0, & \text{otherwise} \end{cases}.$$

In some embodiments, the optical weighting element is an amplitude modulator. In other embodiments, the optical weighting element is a four wave mixer.

In yet another aspect of the invention, a method for increasing sensitivity for detection of ultrafast optical signals includes inserting an optical weighting element upstream of a detector within a direct detection receiver, wherein the optical weighting element is configured to generate an optical pulse that closely matches at least one ultrashort pulse within the input signal so that portions of the input signal that are nonoverlapping with the at least one ultrashort pulse are rejected. The optical weighting element may execute an optical weighting function ƒ(t) according to the relationship $$f(t) = \begin{cases} s(t), & t_0 - \frac{\tau_s}{2} + nT < t < t_0 + \frac{\tau_s}{2} + nT \\ 0, & \text{otherwise} \end{cases}.$$

In some embodiments, the optical weighting element is an amplitude modulator. In other embodiments, the optical weighting element is a four wave mixer.

The benefit of the new approach, termed "optical weighting receiver" ("OWR"), becomes apparent when contrasted with the performance of the conventional direct-detection receiver in detection of picosecond-long, noisy signal. Specifically, the receiver performance can be characterized by measuring the error detection probability ($P_e$) and receiver operating characteristics (ROC). Both measurements confirm the OWR performance superiority: the $P_e$ shows a seventeen-fold decrease, while the detection efficiency in the ROC measurement increases by a five-fold. This sensitivity improvement approach opens the door to a new class of opto-electronic detector technology that can radically improve detected signal integrity while adding only nominal complexity. The resulting improvement in performance has the potential to solve heretofore intractable problems that have hampered progress in various disciplines.

Presently, the sensitivity of the direct-detection receiver is dependent on the electrical bandwidth of the detector and detection electronics, thus preventing the optimal detection of an ultrashort signal obscured by noise (picosecond and sub-picosecond long signal). The inventive OWR can decouple the receiver performance from the electrical bandwidth in detection of the ultrashort signal buried in noise. The result is an order of magnitude reduction of the Bit Error Ratio measurement of the optical gate-aided receiver compared to a direct detection receiver.

Potential applications of the invention for improving the receiver sensitivity in detection of ultrafast (picosecond and shorter) signal obscured by noise include detection of distant radar signals, detection of ultrawideband radio signals, detection of navigational signals, ultrafast spectroscopy, radio astronomy, and medical and bio-imaging.

BRIEF DESCRIPTION OF THE DRAWINGS

FIGS. 2A and 2B illustrate a comparison of the estimated $P_e$ for a direct detection receiver (DDR) (FIG. 2A) and an OWR according to the present invention (FIG. 2B). FIGS. 2C and 2D show a simulated comparison of the estimated error probability for narrow-band DDR and narrow-band OWR, respectively. FIG. 2E illustrates the estimated $P_e$ for an OWR with a narrow-band detector and a constant optical filter bandwidth of 300 GHz where the gating pulse is varied between 0.8% and 50%. FIG. 2F shows estimated $P_e$ for an OWR with a narrow-band detector and a constant optical filter bandwidth of 300 GHz where the gating pulse width is comparable to the signal pulse width.

DETAILED DESCRIPTION OF EMBODIMENTS OF THE INVENTION

Previous theoretical and experimental work relates receiver performance to three parameters: the optical filter bandwidth, the electrical filter bandwidth, and the signal duty cycle. Matching bandwidth parameters to the input pulse improves receiver sensitivity for a given optical and an electrical filter transfer function. However, in many applications involving picosecond and femtosecond pulses this task remains unattainable. The inventive approach of decoupling the receiver performance from the electrical bandwidth in the described setting can be numerically tested by contrasting direct detection and the OWR scheme and is described herein.

Figure 1A:
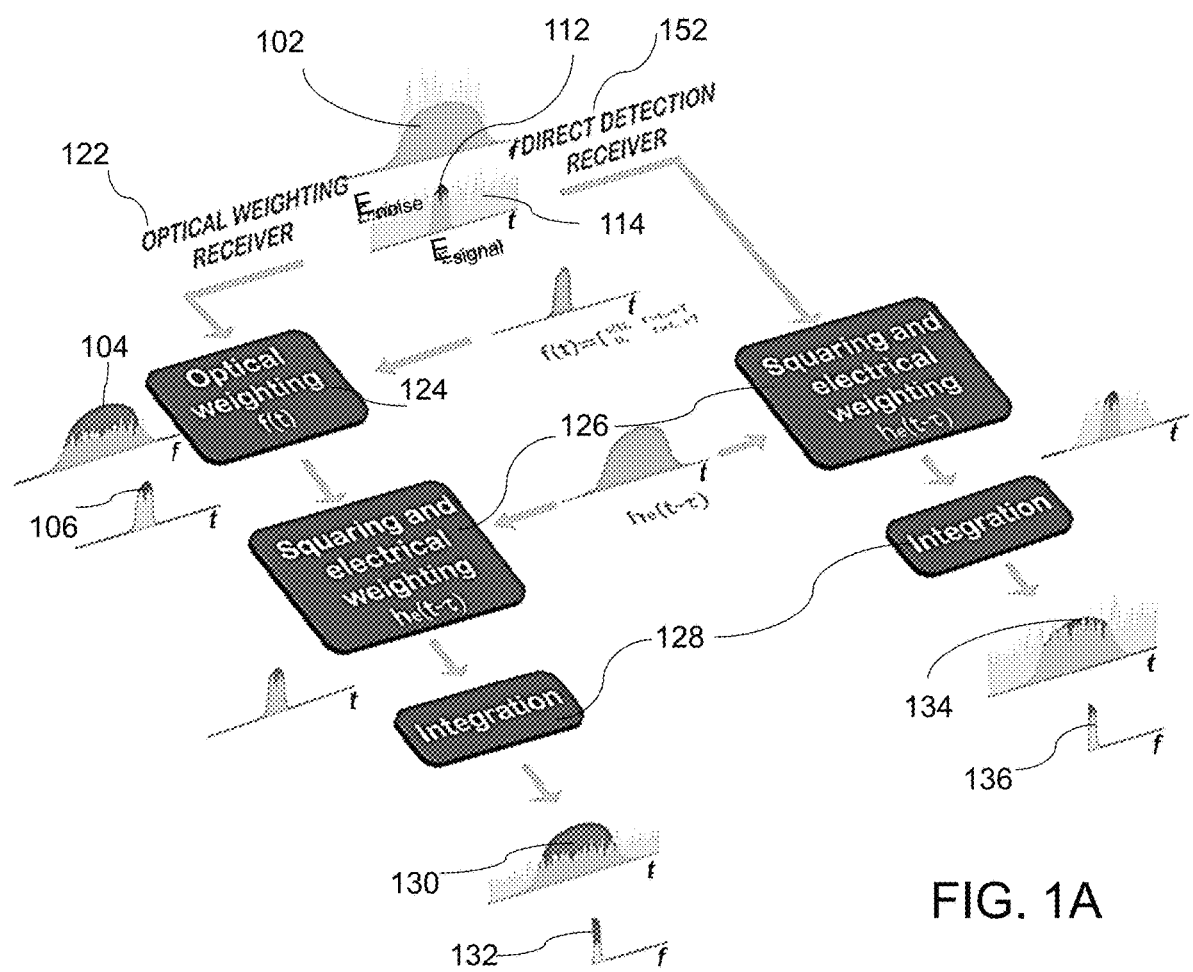
FIG. 1A is a diagrammatic view of the operating principle of an optical weighting receiver according to embodiment of the invention compared against a conventional direct detection receiver.

FIG. 1A illustrates the fundamental difficulties in detection of an ultrashort signal 102 with a conventional direct detection receiver (DDR) 152 and the improvement obtained with the optical weighting receiver (OWR) 122 according to the present invention. In FIG. 1A, input pulse 102 (in frequency domain (ƒ)) is shown in the time domain (t) as a short pulse 112 ($E_{signal}$) within background noise 114 ($E_{noise}$), which is incident onto direct detection receiver 152 with an impulse response $h_e(t)$ 126. After integration 128, the detection current 134, 136 is represented as the integral of the sum of the signal and the noise power over the detector impulse response time $h_e(t)$. In the ideal (matched-detection) case, the electrical weighting function 126 matches the signal and only the noise that coincides with the signal reaches the integrator 128 and the noise is weighted exactly by the signal profile. In practice, however, the conventional electrical weighting function $h_e(t)$ (direct-detection case, in the time domain) is much longer than the ultrashort signal, mandating accumulation of excess noise much beyond the signal time extent, and loss of detection fidelity.

Figure 1B:
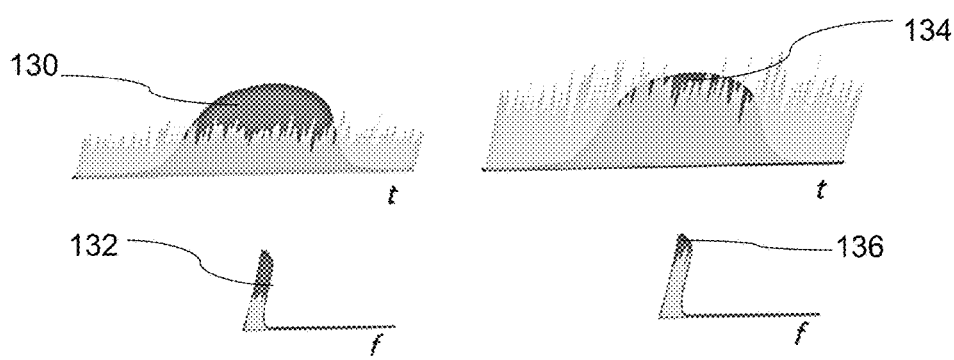
FIG. 1B is enlarged view comparing simulated detector outputs of the OWR and DDR of FIG. 1A.

For the optical weighting receiver 122, the short pulse 112 hidden in noise 114 is optically gated prior to detection 124 (f(t)). Optical weighting 124 rejects optical noise beyond the signal temporal duration, thus preempting the mixing of the signal with the portion of the noise that does not overlap in time with signal to yield pulse 104 in the frequency domain, pulse 106 in the time domain. In practical terms, the new receiver circumvents the electrical bandwidth limitation necessarily imposed on photon-electron conversion by rejecting the noise beforehand. The remaining operations of squaring and electrical weighting (impulse response $h_e(t)$) 126 and integration 128 produce detection current 130, 132, with vastly improved discrimination. FIG. 1B provides an enlarged image of the resulting detection currents for the DDR (134, 136) and OWR (130, 132) to clearly show the enhanced signal within the noise.

The detection process is represented as the convolution of the optical power with the detection system impulse response. The result of the photon-to-electron conversion in the direct detection process is the current $I_{dd}(t)$, typically represented as a product of the responsivity parameter, R, and a convolution of the optical power, $|E(t)|^2$ with the detection system impulse response $h(t)$:

$$I_{dd}(t) = R\int_{-\infty}^{\infty} |E_s(\tau) + E_n(\tau)|^2 h(\tau - t)d\tau = R\int_{-\infty}^{\infty} |E_s(\tau)|^2 h(\tau - t)d\tau + \quad (1)$$

$$R\int_{-\infty}^{\infty}(|E_n(\tau)|^2 + 2\text{Re}(E_s(\tau)E_n^*(\tau)))h(\tau - t)d\tau$$

and $|E(t)|=|E_s(t)+E_n(t)|$, where $E_{s,n}$ are the signal and noise fields respectively. The OWR detection process can be mathematically represented in the following manner:

$$I_{OWR}(t)=R\int_{-\infty}^{\infty}|E_s(\tau)h_g(\tau)+E_n(\tau)h_g(\tau)|h(\tau-t)d\tau= \\ R\int_{-\infty}^{\infty}|E_s(\tau)|^2 h_g(\tau)h(\tau-t)d\tau+R\int_{-\infty}^{\infty}(|E_n(\tau)|^2+2\text{Re}(E_s(\tau)E_n^*(\tau)))h_g(\tau)h(\tau-t)d\tau \quad (2)$$

where f(t) is the optical weighting function, given as $$f(t) = \begin{cases} s(t), & t_0 - \frac{\tau_s}{2} + nT < t < t_0 + \frac{\tau_s}{2} + nT \\ 0, & \text{otherwise} \end{cases} \quad (3)$$

where $\tau_s$ is the weighting function duration, to is the pulse center, T is the pulse period, and n is an integer. In the ideal (matched-detection) case, the electrical weighting function matches the signal and only the noise that coincides with the signal reaches the integrator and the noise is weighted exactly by the signal profile. In practice, however, the conventional electrical weighting function in the direct detection case, in the time domain, is much longer than the ultrashort signal, resulting in the accumulation of excess noise beyond the signal time duration, severely degrading the detected signal fidelity.

The inventive approach deals with the noise addition problem by rejecting optical noise outside of the signal time span, before detection. In an exemplary embodiment, this method is implemented by adding optical weighting to reject optical noise beyond the signal temporal duration to avoid mixing of the signal with the portion of the noise that does not overlap in time with the signal. In practical terms, the OWR circumvents the electrical bandwidth limitation that is necessarily imposed on photon-electron conversion by rejecting the noise beforehand.

Figure 6A:
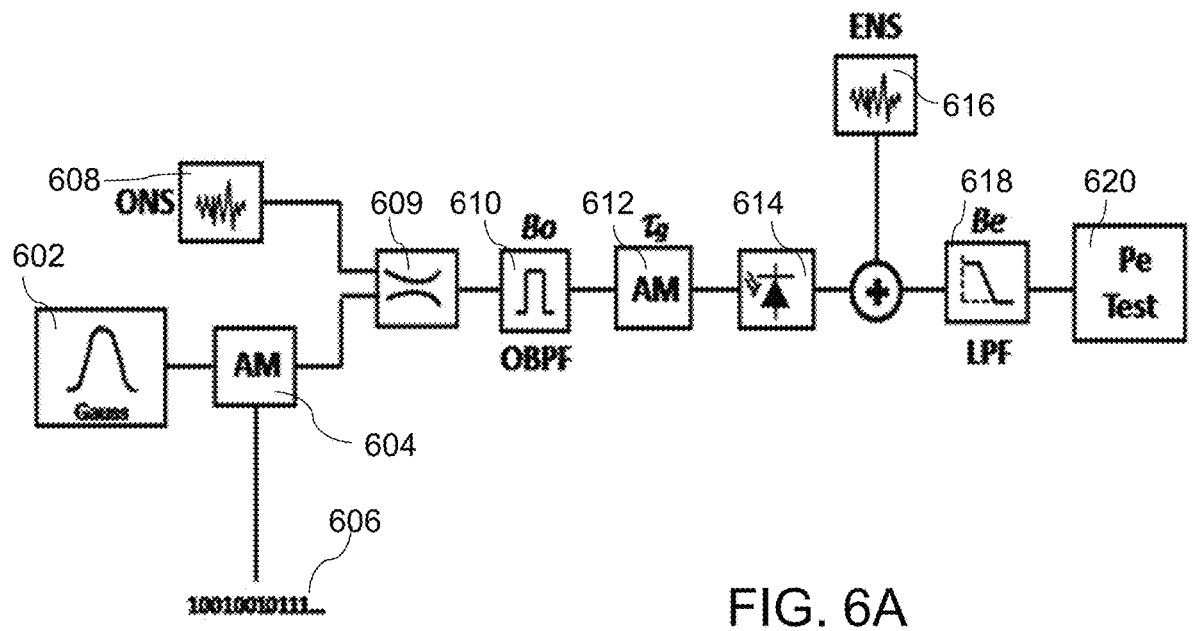
FIGS. 6A and 6B illustrate simulation setups of an OWR and DDR, respectively.
Figure 6B:
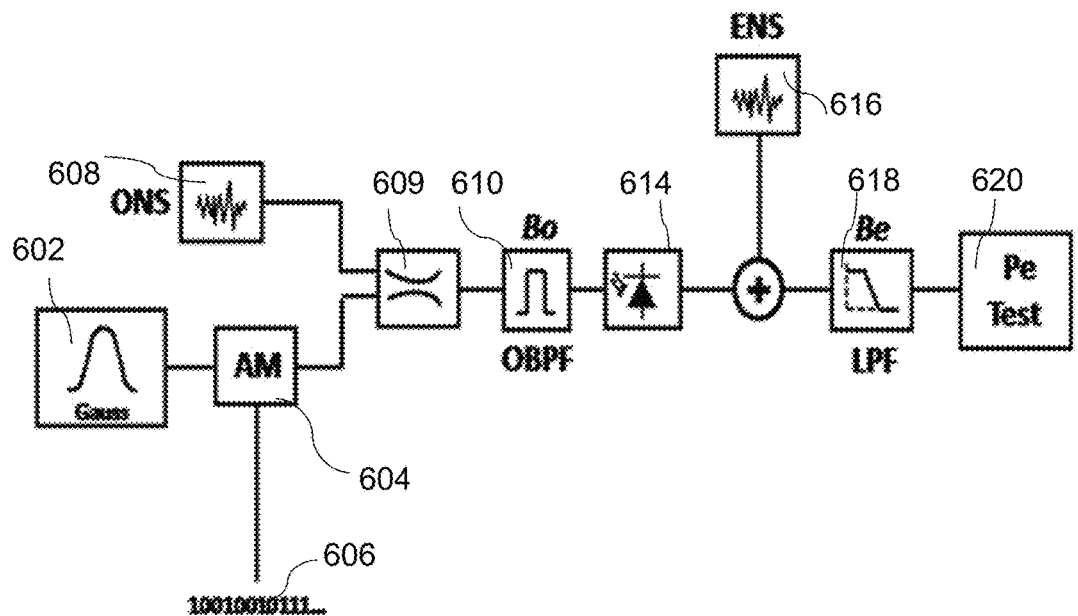

The benefits of the OWR technique were first modeled and compared to direct detection in detection of an ultrashort signal represented by a Gaussian 1.5 ps long noisy signal repeating over a 100 ps period. Detected signal fidelity was characterized by calculating the probability of error ($P_e$), using ta Bit Error Ratio (BER) procedure derived from well-established telecommunication characterization methods. Specifically, the widely-used system characterization approach described by Winzer and Kalmar ("Sensitivity enhancement of optical receivers by impulsive coding", *Journal of Lightwave Technology* 17(2), 171-177 (1999)) was adopted to test the probability of error ($P_e$) driven by two physical parameters: optical filter bandwidth and electrical filter bandwidth. The evaluation was performed using commercial simulation software from VPIphotonics Inc. (Norwood, Mass.). Numerical simulations were performed using the setups shown in FIGS. 6A and 6B, representing the OWR and DDR, respectively. The OWR receiver performance was tested by detecting the 1.5 ps signal 602 with 10 GHz repetition rate. Signal pulses with 0.14 mW peak power were amplitude modulated by amplitude modulator (AM) 604 with a pseudo-random bit sequence 606 and combined with white noise from optical noise source (ONS) 608 with power spectral density of $1.92\times10^{-17}$ W/Hz. The resulting optical-signal-to-noise-ratio of 0.3 is estimated at operation 609 by measuring the average signal and the noise power independently. The combined fields are next passed through a Gaussian-shaped optical-band-pass-filter (OBPF) 610 and either detected directly at detector 614 or optically gated at amplitude modulator 612 with 1.2 ps pulses before detection. Pulse detection was performed by the square-law detector and both a dark current of 0.1 nA and shot noise were added from electrical noise source (ENS) 616 in the detection process. The total current is passed through a fourth-order Bessel-shaped low-pass filter (LPF) 618 with bandwidth Be and guided to the $P_e$ test engine 620. The DDR shown in FIG. 6B has a similar architecture to that of the OWR of FIG. 6A, with the main difference being the absence of the amplitude modulator 612 that introduces optical weighting before the detector 614. Both schemes were tested under equivalent conditions.

The inventive approach to achieving optical weighting of the input signal is not limited to use of the amplitude modulator (AM) arrangement as in the example shown in FIG. 6B. In fact, the experimental set-up described with reference to FIG. 3B, described in more detail below, utilizes a four-wave mixing (FWM) process within a highly nonlinear fiber (HNLF) to generate an idler capable of achieving the appropriate optical weighting. The FWM approach may actually be preferable to the AM method for speed purposes. Selection of other high speed optical processes for generating a matched weighting pulse will be apparent to those of skill in the art.

Figure 2A:
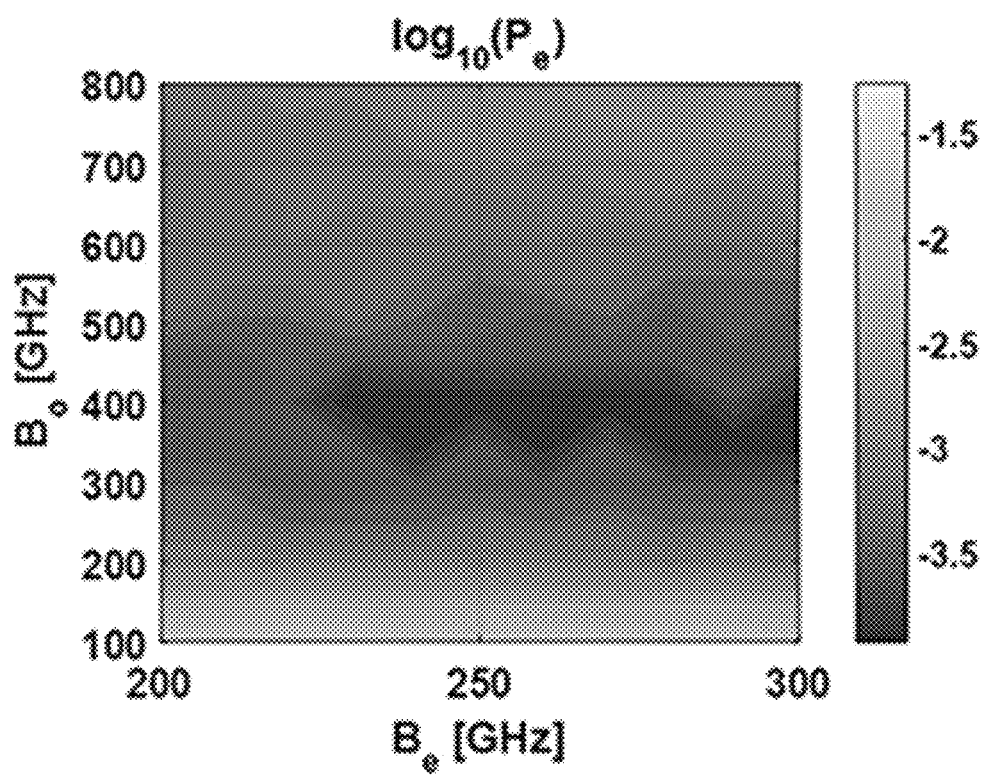
FIGS. 2A-2F illustrate estimated error probability ($P_e$) for simulated receiver parameters.
Figure 2B:
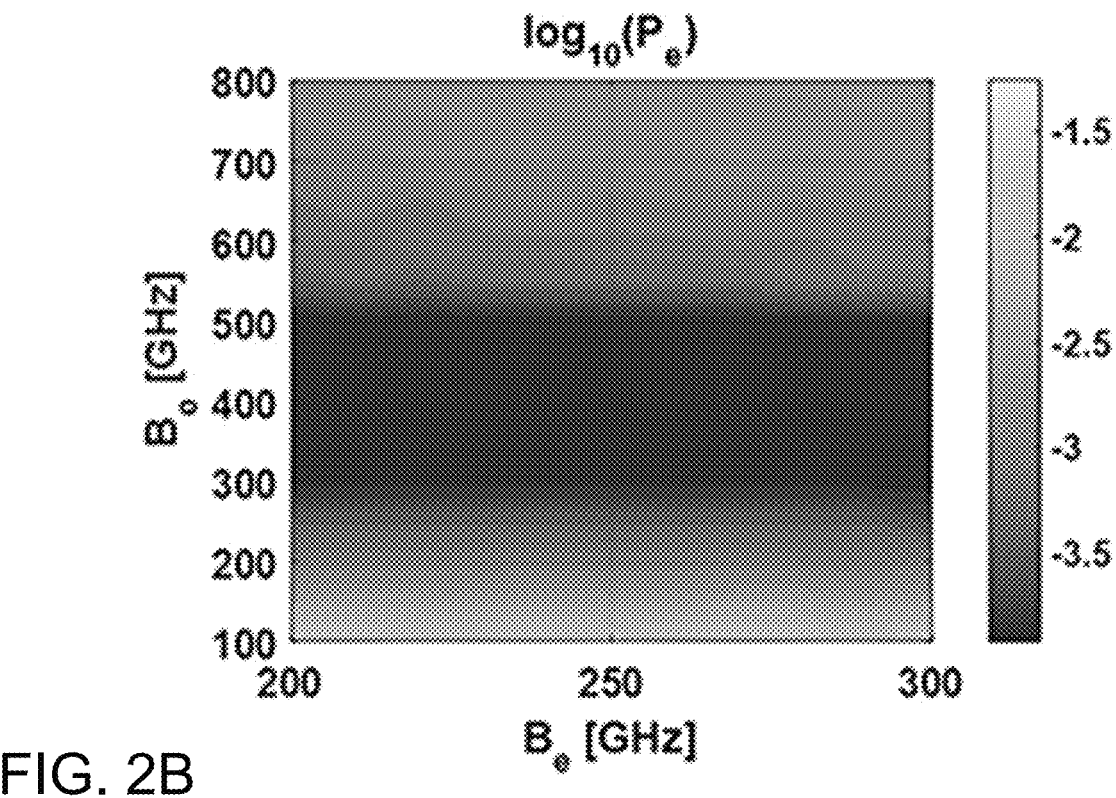
Figure 2C:
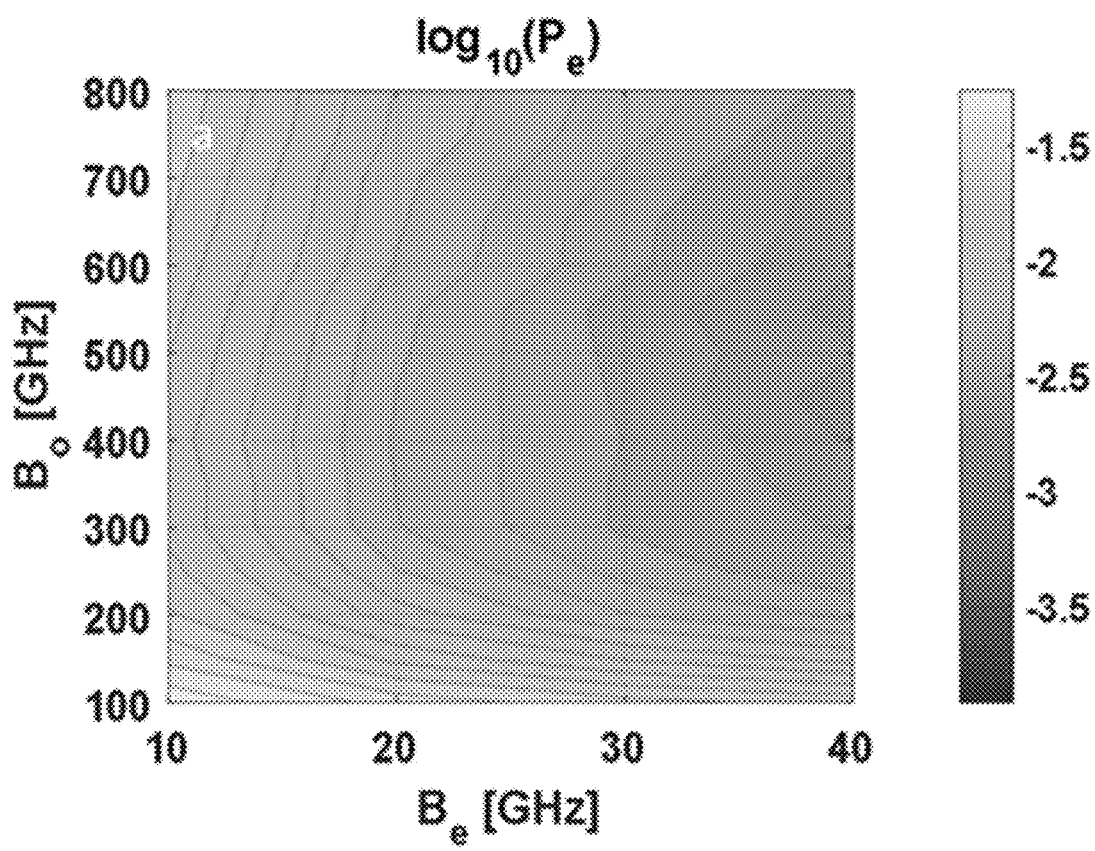
Figure 2D:
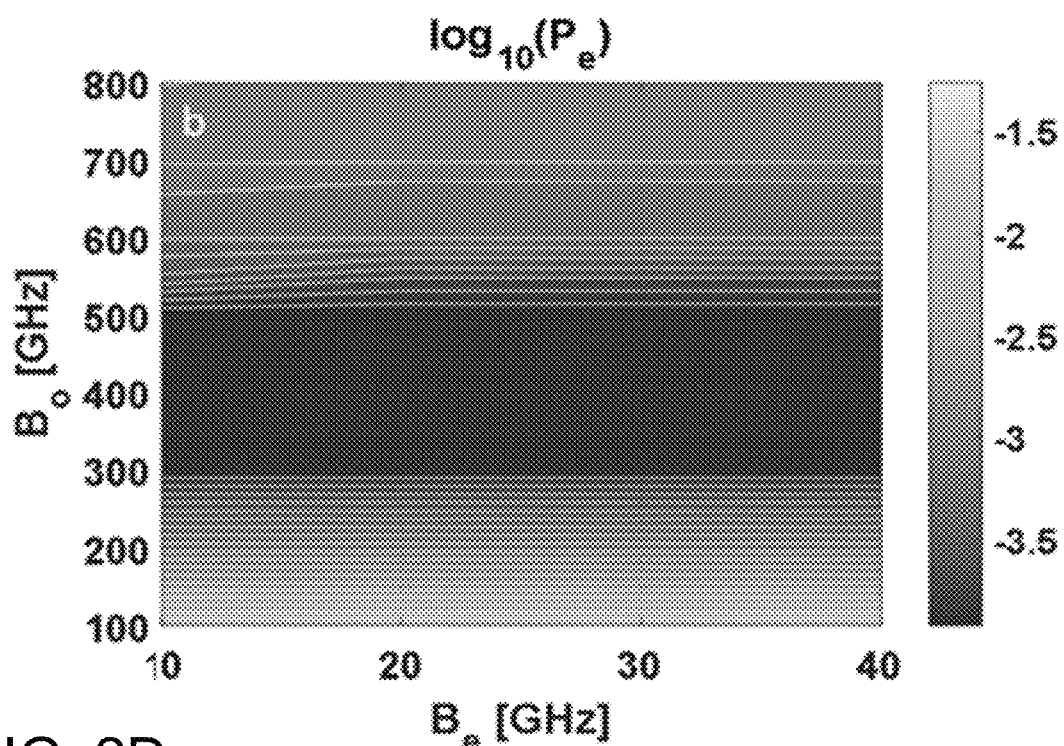
Figure 2E:
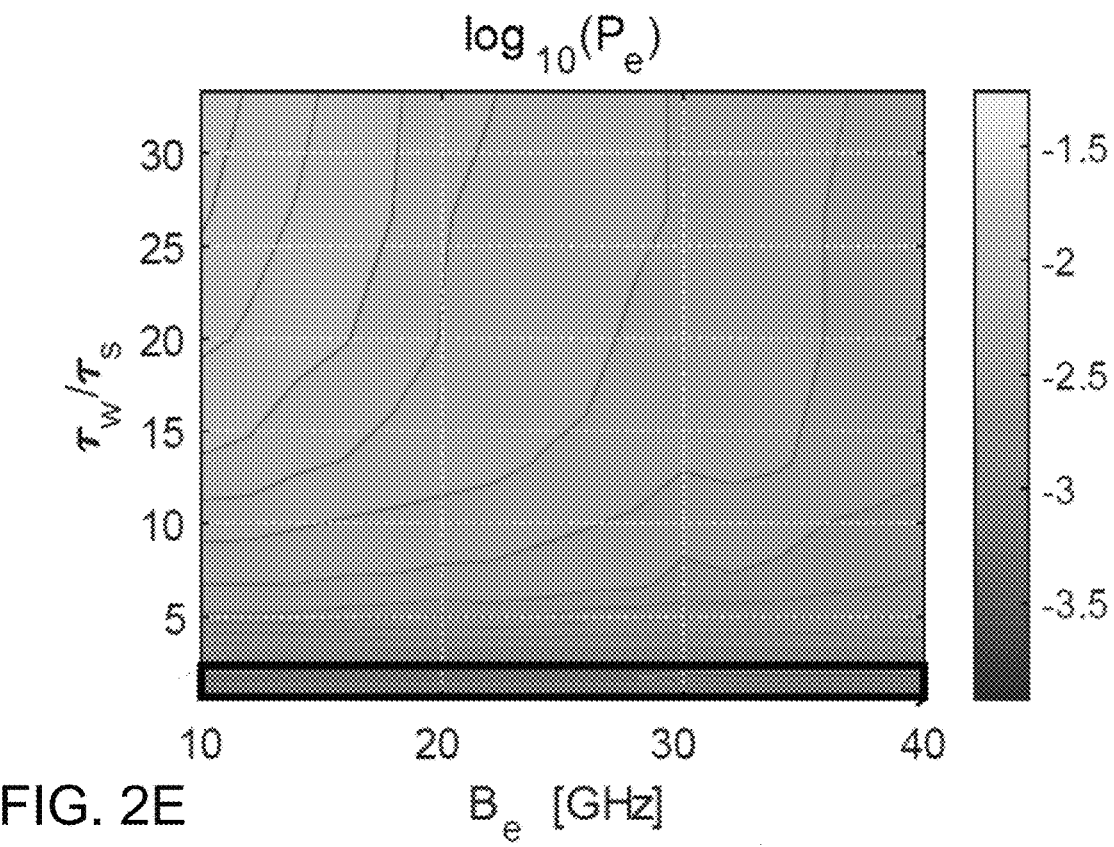

Results of the simulations are shown in FIGS. 2A-2F. FIG. 2A represents the ideal, wide-band DDR with a minimum $P_e$ of 0.00012. For purposes of this description, this value is considered as optimal. The $P_e$ associated with the OWR scheme (FIG. 2B) also reaches the optimal $P_e$ level. However, in a more realistic setting, employing a narrow-band detector, the DDR performance deteriorates notably. This scenario becomes apparent in FIGS. 2C-2D, where the minimum $P_e$ achieved with the OWR method remains an order of magnitude lower than that of the DDR. Further, the OWR performance remains electrical-filter-bandwidth-independent, allowing the scheme to attain the optimal $P_e$ magnitude with the narrow-band receiver. Note that in the absence of optical weighting, no amount of electrical filtering, post square-law detection, can bring the performance below the level of $10^{-3}$.

Figure 2F:
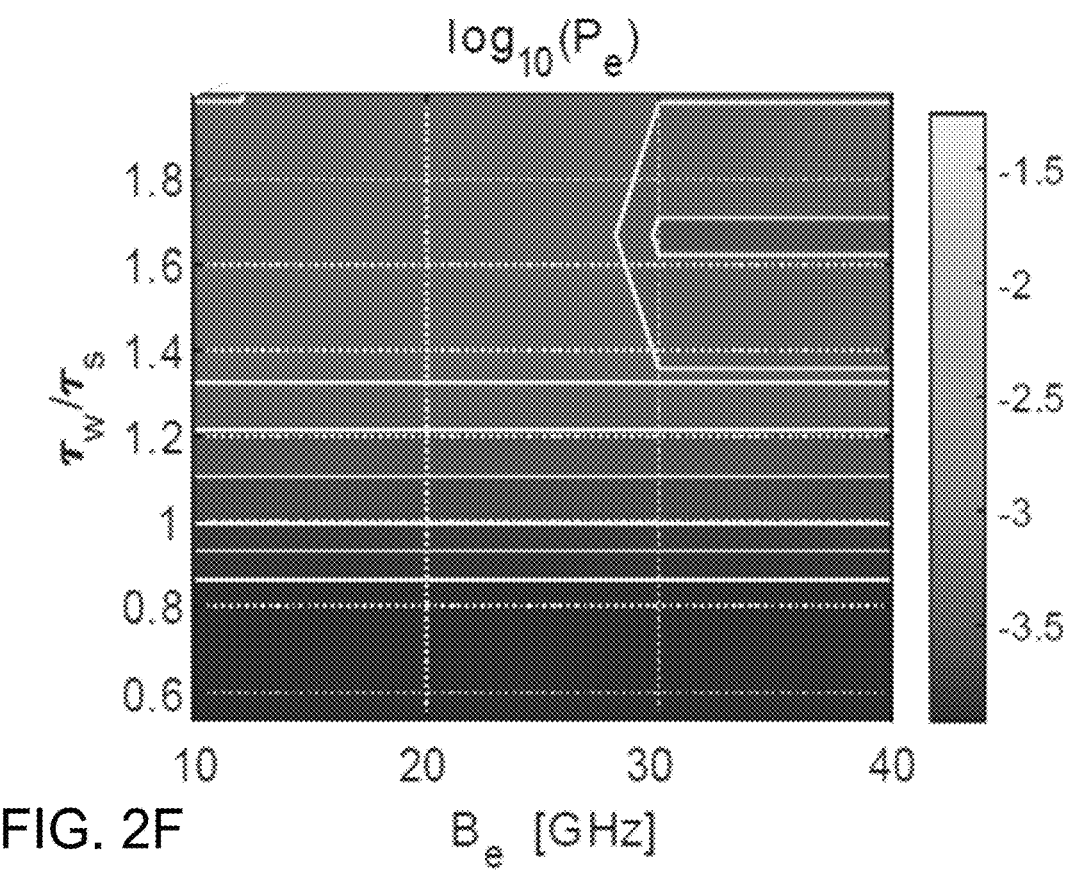

To evaluate the OWR's performance dependence on the gating pulse width, the electrical filter bandwidth was varied in the 10 GHz to 40 GHz range and the gating pulse width 0.8 to 32 times that of the input pulse. As expected, the OWR performance depends strongly on the gating pulse width, demonstrated by significant $P_e$ variations depicted in FIGS. 2E-2F. (Note that FIG. 2F is an expansion along the y-axis of the area within the black rectangle at the bottom of FIG. 2E.) Plotted $P_e$ maps point to an optimal optical weighting design—matching the weighting pulse to the signal directly optimizes the receiver performance.

Example 1—Experimental Verification

Figure 3A:
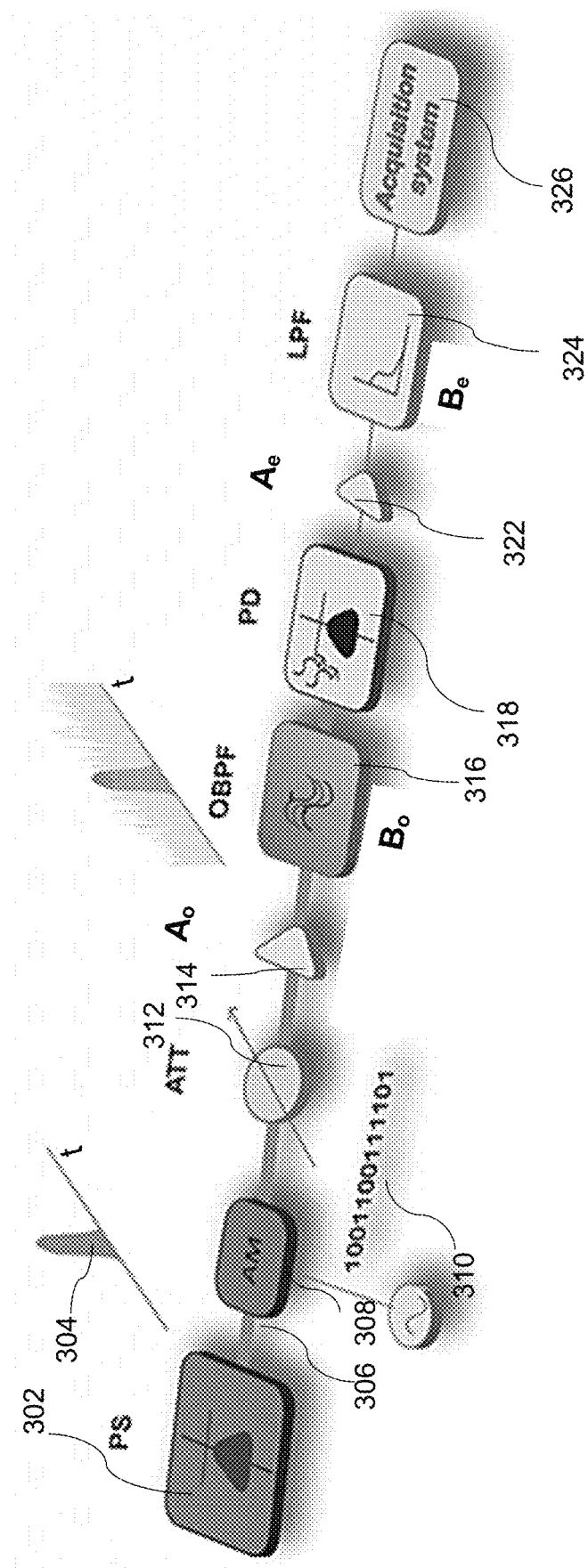
FIGS. 3A and 3B illustrate exemplary experimental set-ups for a DDR and OWR, respectively.
Figure 3B:
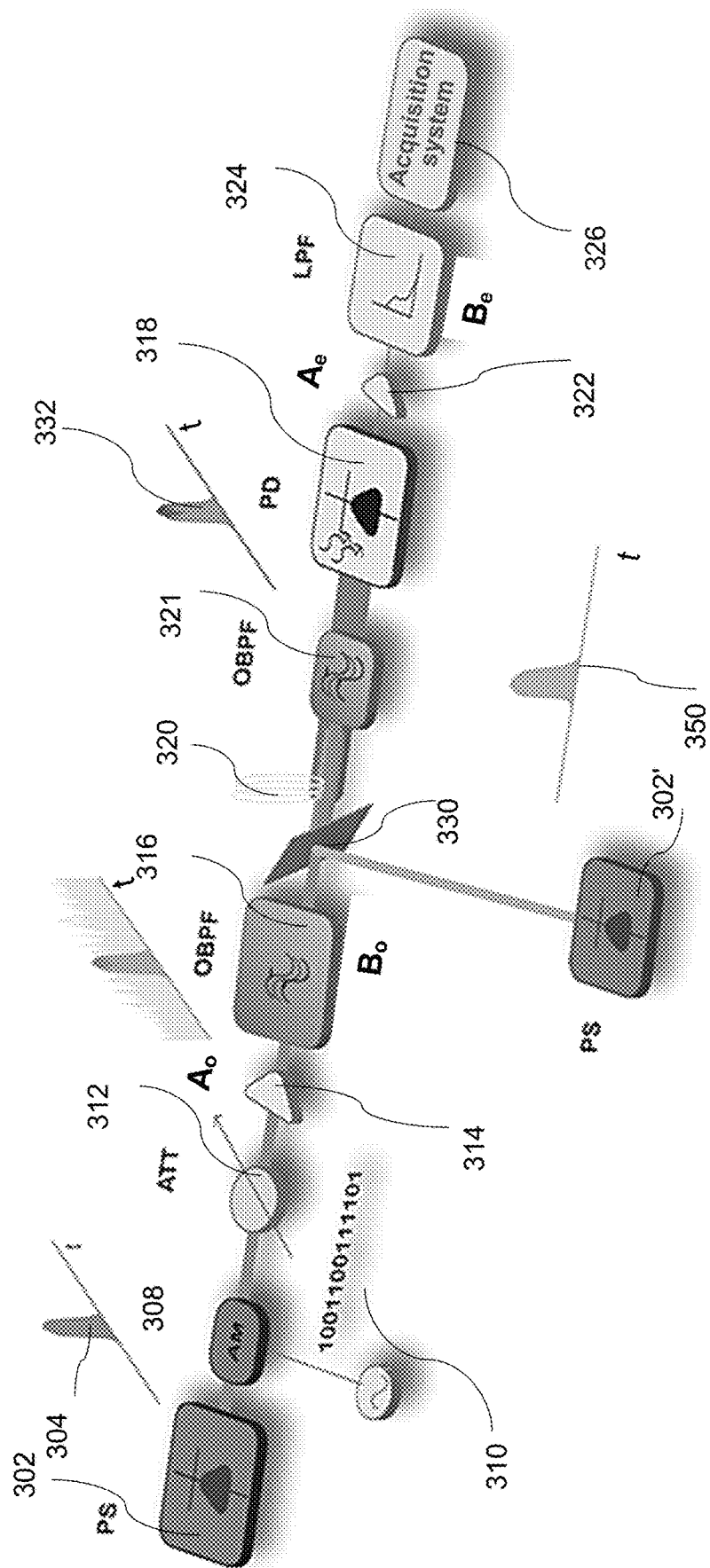

The experimental setup for the verification of the benefits of the inventive OWR approach, emulating the standard telecommunication pre-amplified receiver architecture, is diagrammatically illustrated in FIGS. 3A and 3B for a DDR and OWR, respectively.

Probability of error ($P_e$) measurement was performed using signal pulses 304 of 1.5 ps temporal width and 10 GHz repetition rate, centered at 1557.4, having sinusoidal amplitude and phase modulation, produced by pulse source 302 and compressed in a dispersive fiber 306. The pulse source 302 was divided to create the signal and the weighting pulse source 302' (seen in FIG. 3B). The signal was amplitude modulated at amplitude modulator 308 with a $2^7$-1-long pseudo-random bit sequence 310 and then frequency converted to 1544 nm in the highly nonlinear fiber (HNLF) by means of the four-wave mixing process. The HNLF was characterized by the following global parameters: 182 m fiber length, 1555 nm average zero dispersion wavelength, 0.029 ps/(nm² km) dispersion slope and 28 $W^{-1}km^{-1}$ nonlinear parameter. The signal was next attenuated at attenuator 312 to 24.2 nW and then amplified in an Erbium-doped fiber amplifier (EDFA) 314. The signal average power is monitored at the EDFA input. The value reported in this measurement corresponds to the power before the amplifier front loss—this loss is 0.5 dB (0.5 dB insertion loss corresponds to the loss of two components before the Erbium fiber: the wavelength division multiplexer for combining the pump and signal, and the isolator. The splice loss is not taken into account. The bandwidth of optical bandpass filter (OBPF) 316 at the amplifier output is varied, having the following values: 0.6 nm, 1 nm, 2 nm, 5 nm and 7 nm.

In case of the optical weighting receiver of FIG. 3B, the amplified signal is filtered at filter 316 after which a weighting pulse is generated in an optical fiber using a four-wave mixer (FWM). In this approach, the filtered signal is combined with the weighting pulse from source 302' at combiner 330, which acts as the pump wave 350, then guided into a 20 m long HNLF 320. The generated idler, centered at 1571 nm, is then filtered using a 20 nm OBP filter 321 to remove the weighting pump and the signal. The idler 332 is then detected using a 40 GHz photodiode 318, followed by a 33 GHz electrical amplifier 322, a low-pass filter 324 and an acquisition system 326, which in the test set-up was a real-time oscilloscope. The electrical filter bandwidth was varied at the oscilloscope, having the following set of values: 11 GHz, 20 GHz, 25 GHz, 30 GHz, and 33 GHz. The sampling rate of the real-time oscilloscope was set to 100 GS/s and $10^5$ points are collected per acquisition, corresponding to $10^4$ bits. The reported $P_e$ value is averaged over six measurements.

In the direct detection case, the amplified signal is detected directly by the same detection system as described above. In both the direct detection receiver scheme and the OWR scheme, a single polarization is detected at the amplifier output, by adding a polarization beam splitter after the amplifier. Both measurements are performed under the same conditions and the $P_e$ averaged over six measurements. The $P_e$ map is represented in FIGS. 4A and 4B for the DDR and OWR architectures, respectively.

Figure 4A:
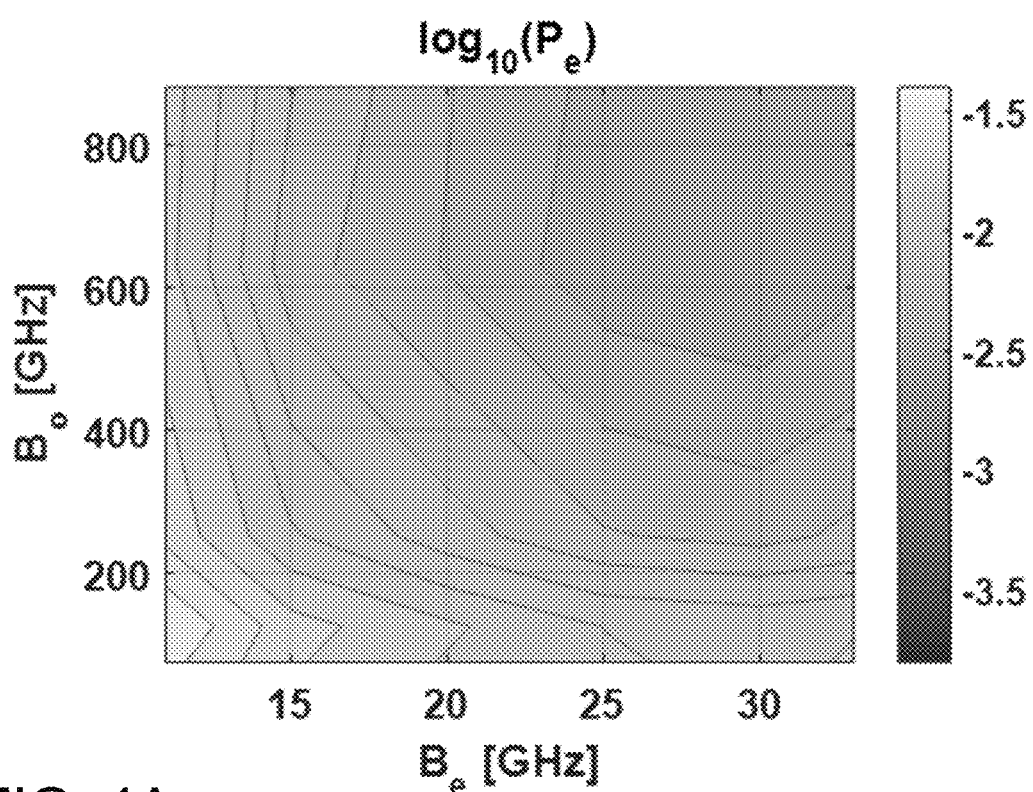
FIGS. 4A and 4B are plots of $P_e$ measurement as a function of optical and electrical filter bandwidth for a DDR and OWR, respectively.
Figure 4B:
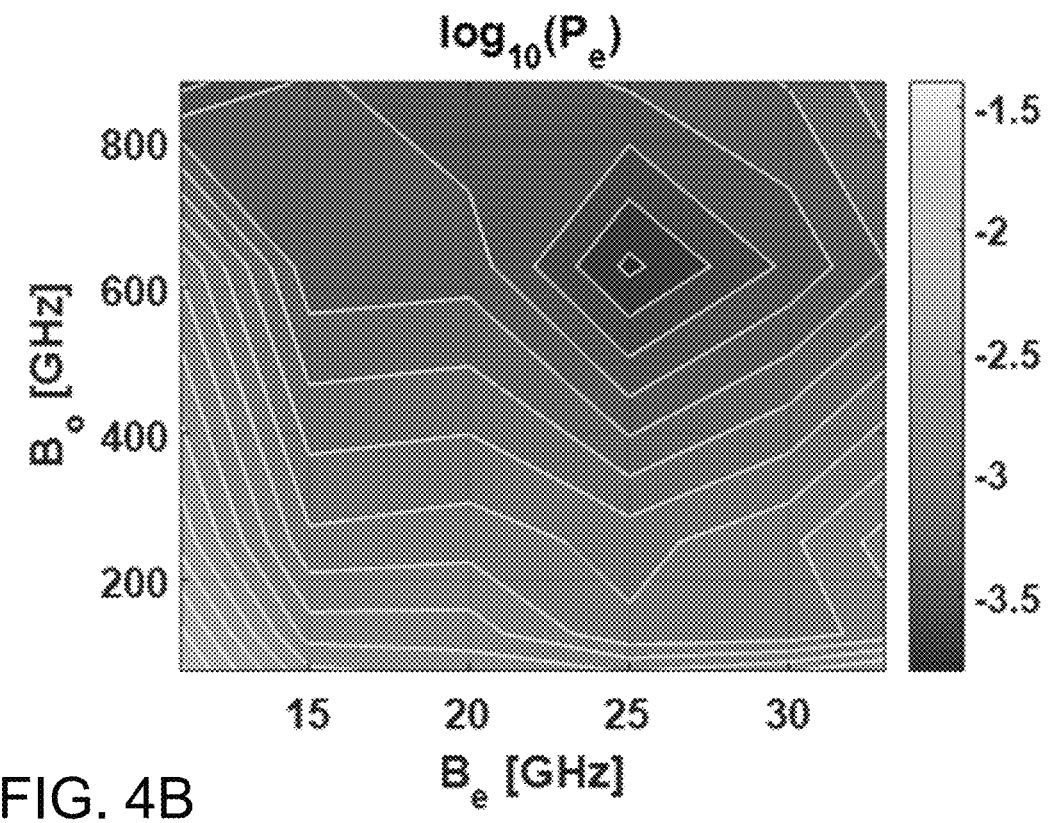

Measurements represented in FIGS. 4A and 4B confirm the significant improvement provided by the OWR approach. As expected, the OWR scheme outperforms the standard direct detection receiver, demonstrated by the seventeen-fold improvement in the $P_e$ measurement. Specifically, a minimum $P_e$ of 0.0032 is measured with the DDR scheme, while an order of magnitude lower minimum $P_e$ of 0.00018 is assessed with the OWR scheme under equivalent conditions. Still, some electrical filter bandwidth dependence is observed in the OWR measurement, a trend contributed to the sub-optimal gating pulse width and the finite gating pulse extinction ratio.

Figure 5A:
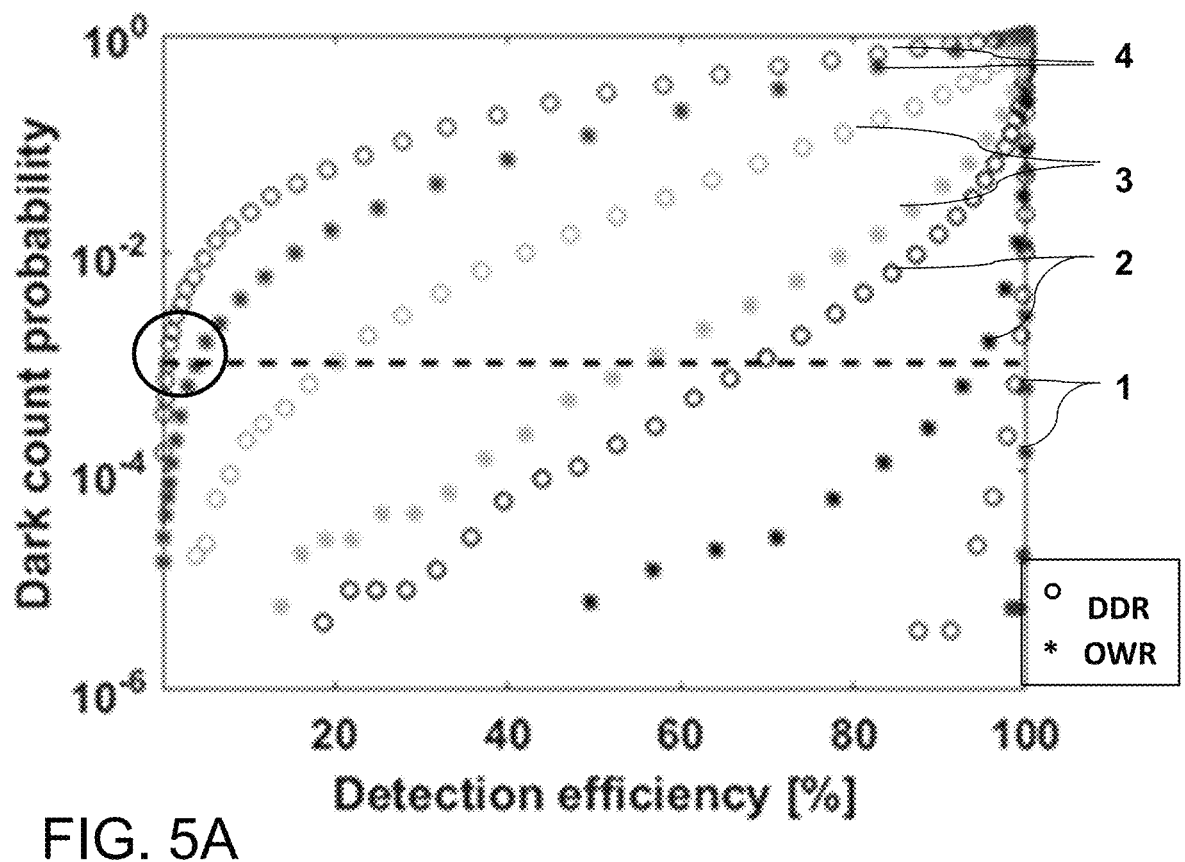
FIG. 5A is a plot of the receiver operating characteristics (ROC) for a DDR and OWR at different signal powers.
Figure 5B:
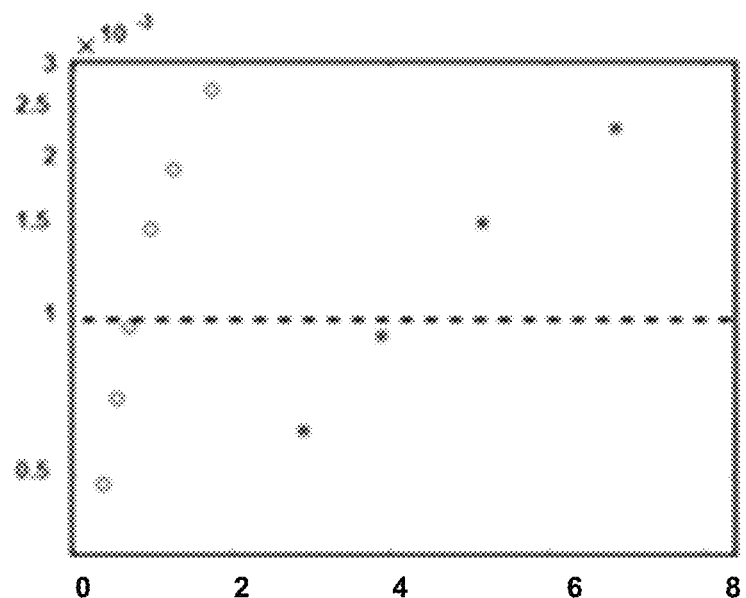
FIG. 5B is an enlarged view of the area within the circle of FIG. 5B.

Finally, the two detection schemes are contrasted by measuring the receiver operating characteristics (ROC) curve at different average signal power levels $<P_s>$. FIGS. 5A and 5B represent the dark count probability, measured as a function of the detection efficiency by varying the detection threshold. Measurements were performed for a different average signal power at the amplifier input, ranging from 1.54 nW to 23.99 nW (corresponding to 1.2 to 18.6 average number of photons per bit). In the ROC plots, the DDR results are represented by the "o" marker while the OWR results are represented by "*" marker. The curve pairs for the DDR and OWR are numbered from right to left as indicated in Table 1 below:

| Curve Pair No. | Signal Power $<P_s>$ |
| --- | --- |
| 1 | 23.99 nW |
| 2 | 12.19 nW |
| 3 | 6.15 nW |
| 4 | 1.54 nW |

FIG. 5B is an enlargement of the area in the circle within FIG. 5A, showing the detailed results for the 1.54 nW signal power (curve pair no. 4).

The dark count probability is measured as the probability of sending the logical "zero" state and detecting the "one" state, P(1|0); the detection efficiency is measured as the probability of sending the logical "one" state and detecting the logical "one" state, P(1|1). In this measurement, the sampling rate was set to 100 GS/s, as in the case of the $P_e$ measurement. The number of bits per acquisition was $10^4$ and was chosen for computational expediency. The ROC curves are assembled by taking multiple single-shot measurements at distinct points in time to increase the total number of points. The total number of points was greater than $10^5$.

The average photon number per bit is estimated from the average power, measured at the amplifier input. The average photon number per bit $<N_{bit}>$ of the classically attenuated signal is calculated with the following equation:

$$\langle N_{bit} \rangle = \frac{\langle P \rangle T}{hf}$$

where <P> is the average signal power, T is signal period, h is Planck's constant and $f$ is signal frequency. The average photon number per pulse is twice the average photon number per bit, where the factor of two originates from the PRBS modulation, having the same probability of 0 and 1.

These measurements again clarify superiority of the inventive OWR approach, demonstrated by more than 5-fold detection efficiency increase for a fixed dark count probability of 0.001 and average signal power at the amplifier input of $\langle P_s \rangle$=1.54 nW. The OWR scheme shows unprecedented performance in direct detection of ultrashort signal obscured by noise. These results represent an important milestone in optimizing ultrashort signal detection.

The OWR approach described herein has been shown to outperform a typical narrow-band receiver in ultrashort pulse detection. Specifically, experimental results demonstrate the viability of decoupling the receiver performance from its electrical bandwidth in the OWR architecture, allowing the scheme to reach the optimal $P_e$ value with narrow-band receiver. Experimental measurements are consistent with theoretical predictions; seventeen-fold improvement in the $P_e$ is achieved with the OWR scheme, compared to a direct detection scheme. Reconcilable results are observed in the ROC measurement, where more than 5-fold increase in the detection efficiency is evaluated for the average input signal power of 1.54 nW at the amplifier input.

The inventive OWR approach shows immense potential in achieving optimal ultrafast pulse detection, with a plethora of applications across disciplines. Specifically, besides typical telecommunication receiver architecture demonstrated in this work, many applications in medicine and biology could largely benefit from the OWR receiver. Recent breakthroughs in histopathological tissue imaging provide one example of such an application that is limited by its reliance on existing direct detection receiver architecture for ultrafast pulse detection. Optical coherence tomography-based imaging is another example of an application in which a coherent detection scheme is implemented for ultrashort pulse detection. While coherent detection technique is inherently more sensitive than the direct detection method, it is also a subject to strict arm balancing requirements that are often difficult to meet. The OWR scheme, thus, has potential to improve the detection sensitivity of the misbalanced coherent receiver. Such improvement could significantly increase the acquisition rate and possibly the depth range in optical coherence tomography.

In summary, receiver sensitivity improvement is achieved by employing optical weighting prior to detection of the picosecond-long signal obscured by noise. Findings indicate the possibility of decoupling receiver performance from its electrical bandwidth, ultimately optimizing the probability of error. Such sensitivity improvement is beyond the reach of the standard, narrow-band, direct detection receiver technologies. Although the preceding description involves sensitive detection of picosecond-long pulses, the technique applies to pulses of arbitrary duration. Indeed, the technological advancement represented by the OWR approach provides a path to a new class of opto-electronic detector technology with a potential to bring profoundly transformative effects across many disciplines.

As will be apparent to persons of skill in the art, modifications and variations to the specific detector types and architectures described in the examples may be made without deviating from the inventive approach of introducing an optical weighting element and operation prior to detection of ultrafast signals. Accordingly, the scope of the invention is not intended to be limited to the specific embodiments described herein, but is intended to encompass all optical detector arrangements that employ optical weighting to preempt mixing of noise within the input signal with the portion of the signal corresponding to the ultrashort pulse.

REFERENCES

[1] Khilo, A., et al., "Photonic ADC: overcoming the bottleneck of electronic jitter", *Optics Express* 20(4), 4454-4469 (2012).

[2] Koos, C., et al., "All-optical high-speed signal processing with silicon-organic hybrid slot waveguides", *Nature Photonics* 3, 216-219 (2009).

[3] Kuo, B. P.-P., et al., "Transmission of 640-Gb/s RZ-OOK channel over 100-km SSMF by wavelength-transparent conjugation". *Journal of Lightwave Technology* 29(4), 516-523 (2011).

[4] Sibbett W., et al., "The development and application of femtosecond laser systems," *Optics Express* 20(7), 6989-7001 (2012).

[5] Konig, K, et al., Clinical two-photon microendoscopy," *Microscopy Research and Technique* 70, 398-402 (2007).

[6] Barretto, R. P. J., et al., "Time-lapse imaging of disease progression in deep brain using fluorescence microendoscopy," *Nature Medicine* 17, 223-228 (2011).

[7] Mejan, G. et al., "Remote detection and identification of biological aerosols using femtosecond terawatt lidar system," *Applied Physics B* 78, 535-537 (2004).

[8] Udem, T. H., et al., "Optical frequency metrology," *Nature* 416, 233-237 (2002).

[9] McDonoigh, R. N.; and Whalen, A. D. *Detection of signals in noise* (Academic Press, San Diego, 1995).

[10] Kay, S. *Fundamentals of statistical signal processing, Volume II: Detection theory* (Prentice Hall, Upper Saddle River, 1998).

[11] Winzer, P. J.; and Kalmar, A., "Sensitivity enhancement of optical receivers by impulsive coding," *Journal of Lightwave Technology* 17(2), 171-177 (1999).

[12] Chen, Y., et al., "Reducing ASE effect in coherent detection by employing double-pass fiber preamplifier and time-domain filter," *IEEE Journal of Quantum Electronics* 45(10), 1289-1296 (2009).

[13] Sanjoh, H., et al., "Time-domain filtering to reduce signal-spontaneous beat noise for a pulse-type multiwavelength light source," *IEEE Photonics Technology Letters* 15(5), 757-759 (2003).

[14] Derickson, D.; and Muller. M. *Digital Communications Test and Measurement* (Prentice Hall, Boston, 2008).

[15] Slavik, R., et al., "All-optical phase and amplitude regenerator for next-generation telecommunications systems." *Nature Photonics* 4, 690-695 (2010).

[16] Otsuji, T., et al., "10-80-Gb/s highly extinctive electrooptic pulse pattern generation," IEEE *Journal of Selected Topics in Quantum Electronics* 2(3), 643-649 (1996).

[17] Andrekson, P. A.; and Westlund, M. Nonlinear optical fiber based high resolution all-optical waveform sampling. *Laser & Photonics Reviews* 1(3), 231-248 (2007).

[18] Agrawal, G. P. *Nonlinear Fiber Optics* (Academic Press, San Diego, 2007).

[19] Osche, G. R. *Optical detection theory for laser applications* (Wiley, Hoboken, 2002).

[20] Tu, H, et al., "Stain-free histopathology by programmable supercontinuum pulses," *Nature Photonics* 10, 534-540 (2016).

[21] Huang, D., et al., *Optical coherence tomography. Science* 254, 1178-1181 (1991).

The invention claimed is:

1. An optical receiver for ultrafast signal detection, the receiver comprising:
   a direct detection receiver configured for receiving an input signal generated by a pulse source, the input signal comprising at least one ultrashort pulse within signal noise, the at least one ultrashort pulse having a temporal duration;
   an optical pulse generator configured to generate an optical weighting pulse that closely matches the at least one ultrashort pulse; and
   an optical bandpass filter configured to receive a combination of the input signal and the optical weighting pulse and output a weighted pulse signal having enhanced detectability, wherein portions of the input signal within the temporal duration are multiplied by a non-zero function and portions of the input signal that are beyond the temporal duration are rejected.

2. The optical receiver of claim 1, wherein the optical pulse generator comprises a four-wave mixer, wherein the combination of the input signal and the optical weighting pulse is guided into a highly non-linear fiber (HNLF) to generate an idler.

3. The optical receiver of claim 1, wherein the optical bandpass filter is configured to remove a weighting pump signal and the input signal.

4. An optical receiver for ultrashort signal detection, the receiver comprising:
   an optical pulse generator configured to generate an optical weighting pulse that closely matches at least one ultrashort pulse within an input signal received by a direct detection receiver; and
   an optical bandpass filter configured to filter the input signal and the optical weighting pulse and output a weighted pulse signal having enhanced detectability, wherein portions of the input signal that are within the temporal duration are multiplied by a non-zero function and portions of the input signal that are beyond the temporal duration are rejected.

5. The optical receiver of claim 4, wherein the optical pulse generator comprises a four-wave mixer, wherein the combination of the input signal and the optical weighting pulse is guided into a highly non-linear fiber (HNLF) to generate an idler.

6. The optical receiver of claim 4, wherein the optical bandpass filter is configured to remove a weighting pump signal and the input signal.

7. A method for increasing sensitivity for detection of ultrafast optical signals, the method comprising:
   inserting an optical pulse generator upstream of a detector within a direct detection receiver, wherein the optical pulse generator is configured to generate an optical weighting pulse that closely matches at least one ultrashort pulse within the input signal; and
   filtering a combination of the input signal and the optical weighting pulse to output a weighted pulse signal having enhanced detectability so that portions of the input signal that are nonoverlapping with the at least one ultrashort pulse are rejected.

8. The method of claim 7, wherein the optical pulse generator comprises a four-wave mixer, wherein the combination of the input signal and the optical weighting pulse is guided into a highly non-linear fiber (HNLF) to generate an idler.

9. The method of claim 7, wherein filtering comprises removing a weighting pump signal and the input signal.

* * * * *